United States Patent [19]

Fedoseev et al.

[11] 4,104,441

[45] Aug. 1, 1978

[54] POLYCRYSTALLINE DIAMOND MEMBER AND METHOD OF PREPARING SAME

[75] Inventors: Dmitry Valerianovich Fedoseev; Boris Vladimirovich Deryagin, both of Moscow; Valentin Nikolaevich Bakul; Alexei Iosifovich Prikhna, both of Kiev; Valentin Pavlovich Varnin; Stanislav Pavlovich Vnukov, both of Moscow; Valentin Korneevich Gerasimenko, Kiev; Jury Ivanovich Nikitin, Kiev; Nekhemyan Veniaminovich Tsypin, Kiev; Anatoly Vasilievich Hochko, Kiev, all of U.S.S.R.

[73] Assignees: Institut Sverkhtverdykh Materialov SSR, Kiev; Institut Fizicheskoi Khimii Akademii Nauk, Moscow, both of U.S.S.R.

[21] Appl. No.: 688,003

[22] Filed: May 19, 1976

Related U.S. Application Data

[63] Continuation of Ser. No. 600,080, Jul. 29, 1975, abandoned.

[51] Int. Cl.$^2$ .......................... B29F 5/00; C04B 31/16
[52] U.S. Cl. ................................... 428/408; 428/403; 264/109; 264/125; 156/613; 427/249; 423/446; 51/307
[58] Field of Search ........................ 428/402, 403, 408; 51/307, 309; 156/610, 613; 423/446; 264/109, 125; 427/249

[56] References Cited

U.S. PATENT DOCUMENTS

| | | | |
|---|---|---|---|
| 3,030,188 | 4/1962 | Evevsole | 423/446 |
| 3,141,746 | 7/1954 | De Lai | 51/309 X |
| 3,399,254 | 8/1968 | Dunnington | 264/109 |
| 3,574,580 | 4/1971 | Stromberg et al. | 51/307 |
| 3,630,678 | 12/1971 | Gardner | 423/446 |
| 3,714,334 | 1/1973 | Vickery | 423/446 |

*Primary Examiner*—Ralph S. Kendall
*Attorney, Agent, or Firm*—Holman & Stern

[57] ABSTRACT

A method of preparing a polycrystalline diamond member comprising sintering diamond particles having deposited thereon, not only diamond coating, but also diamond-graphite coating In the epitaxial method of coating according to the invention, diamond particles may be the finest ones of a size smaller than one micron. The resulting compact member is characterized in the absence of marked graphite inclusions, and diamond cleavage between the particles results in a considerable improvement of the strength of the compact member.

2 Claims, 1 Drawing Figure

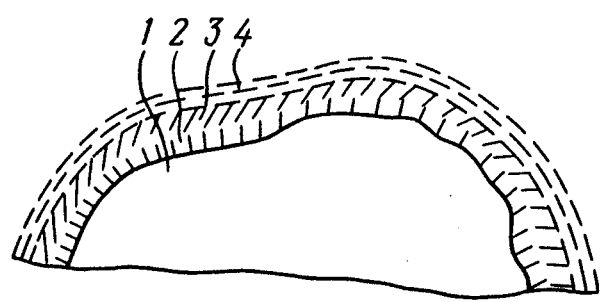

POLYCRYSTALLINE DIAMOND MEMBER AND METHOD OF PREPARING SAME

This is a continuation of application Ser. No. 600,080 filed July 29, 1975 now abandoned.

The present invention relates to methods of preparing superhard materials, and in particular to methods of preparing diamond based compact products which may be used in making drilling tools for operation under dynamic loads, in reinforcing blade-type cutting tools, in the manufacture of extrusion dies and the like tools.

It is known to prepare a compact product by sintering diamond particles under high pressure and at a high temperature (cf. U.S. Pat. Nos. 3,574,580, 3,141,746; Japanese Patent 44-27-283; British Pat. No. 1240526).

The material prepared by the above-mentioned methods containes up to 2% of non-diamond inclusions, such as boron, titanium, tantalum, molybdenum and other metals or carbides thereof which are probably inevitable in the production of a polycrystal line diamond member by these prior art methods. The main disadvantage of such products is a comparatively low thermal resistance which is due to the presence of metal inclusions.

It is known to sinter a plurality of diamond particles under a high pressure and at a high temperature (cf. French Pat. No. 2026389), wherein, in order to obtain a polycrystalline diamond member, first there are provided the conditions for a partial graphitization of diamond particles, and then the resulting graphite is converted into diamond by applying pressure and temperature (T = 2167° C P = 85 kbar).

The disadvantage of this method consists in that the surfaces of diamond particles are not cleaned from contaminants and inclusions prior to the sintering. Thus, this method cannot provide for a stable sintering process, and the resulting compact product is heterogeneous and of fluctuating quality. In addition, preparing the product with graphitization by the above method is associated with diamond losses so that the size of diamond particles used is limited to a certain minimum.

This disadvantage is, to a some extent, eliminated in making a dense coherent diamond compact binderless product by the method disclosed in U.S. Pat. No. 3,574,580.

This method comprises treating diamonds in the temperature range from 300° to 1000° C for half an hour under a reduced pressure of P = $10^{-6}$ torr. After degassing and evacuating to P = $10^{-7}$ torr, the particles are cooled and allowed to stay in a dry inert gas. Prior to the sintering, the particles are placed into a capsule and evacuated (P = $10^{-4}$ torr). Then the pressure and temperature are raised up to a point above the point of conversion of graphite into diamond. Thus the particles are sintered and strongly bound to one another.

The above-described method has the following disadvantages:
high fragility of product making it unsuitable for cutting tools operating under dynamic loads;
use of metal capsules, presealing and evacuation to $10^{-4}$ torr;
limitation of size of particles being sintered which is due to the fact that, before the temperature and pressure above the point of conversion of graphite into diamond are attained, a partial graphitization of microscopically fine diamond powder occurs, and submicron particles (those having a size smaller than one micron) are converted into graphite. Graphitization of particles is also possible during the cleaning of their surface. The formation of a bond between grains in the prior art method occurs due to conversions in neighbouring diamonds which form a kind of support. Crystal defects appear where the supports are not oriented relative to one another in the boundary zone so that the diamond cleavage has a reduced strength.

It is an object of the invention to provide a method of preparing a polycrystalline diamond member which has a high strength and is structurally isotropic, while using starting diamond grains of practically any size.

Another object of the invention is to provide a method ensuring the preparation of polycrystalline diamond members having the above-mentioned properties using a production process which is comparatively simple and does not require costly production steps or modifications.

Still another object of the invention is to provide a compact diamond product which has improved working parameters and is suitable for reliable operation under dynamic loads.

These and other objects are accomplished by the provision of a method of preparing a polycrystalline diamond member, wherein diamond particles having a coating are placed in a high pressure and high temperature chamber to be sintered therein for a time sufficient to provide a strong bond between diamond particles thus forming a single compact body. This method is characterized in using diamond particles of practically any size including these having minimum size of less than one micron, epitaxially depositing both diamond and diamond-graphite coating on said particle, and sintering the resulting particles having diamond-graphite coating in contact with one another in such a manner that, as a result a combined action of mechanical pressure and heating, phase conversions occur in the coating material in the zone of contact between the particles with the formation of diamond zones binding the particles into a single compact body which is substantially free from graphite inclusions.

The above-described sequence of steps results in the fact that in the manufacture of a polycrystalline diamond member, diamond grains having epitaxially deposited coating composed of diamond and diamond-graphite layers are subjected to sintering. The polycrystalline diamond member prepared by the method according to the invention is characterized in that the material which binds together various particles is diamond which is formed as a result of the phase conversion in the diamond-graphite material.

According to one embodiment of the invention, the method of preparing a polycrystalline diamond member is characterized in that said diamond particles are selected to have substantially identical size, and the process of epitaxial deposition of coating in a flow of a carbonaceous medium is interrupted by a predetermined moment prior to the formation of a pure graphite layer on the particles.

The method according to the invention enables the use of starting diamond particles of practically any size since it involves the employment of particles having a diamond-graphite coating epitaxially deposited thereon.

According to another embodiment of the invention, there is provided a polycrystalline diamond member prepared by the above-described method containing a plurality of diamond particles bound into a single compact body, characterized in that the binder comprises diamond zones substantially free from graphite which are formed as a result of phase conversion in the zones of contact of diamond-graphite coatings of various diamond particles.

The invention will now be described in detail with reference to specific embodiments of the method illustrated in the FIGURE, showing a cross-section of a polycrystalline diamond member according to the invention.

The effect of diamond particles with epitaxially deposited diamond-graphite coating on their surface may be explained by the following theory.

When epitaxially depositing carbon on diamond from a gaseous phase (cf. B. V. Deryagin, D. V. Fedoseev, V. N. Bakul' et al., Physical and Chemical Synthesis of Diamond from Gas, TEKHNIKA Publishers, Kiev, 1971, p. 8), carbon 2 having the diamond structure is deposited directly on diamond 1. The process is conducted in metastable conditions so that, along with the continuing diamond growth, graphite nuclei appear and develop as the process goes on. Thus a transitory diamond-graphite layer 3 is formed. Further conduct of the process results in the prevailing growth of graphite 4 since the latter is thermodynamically more stable than diamond. The density of the deposited diamond-graphite coating varies with thickness from the diamond density to graphite density, the density of graphite formed under these conditions being very high and approximating the theoretical value. If graphite of the diamond graphite layer is oriented, the orientation is lost during further deposition of carbon. In synthesizing diamond by the epitaxial method, the formation of diamond-graphite layer, and especially graphite layer, is undesirable. Therefore, the process of epitaxial synthesis of diamond is normally interrupted after the deposition of diamond layer by the moment of appearance of graphite nuclei.

The characteristic feature of the transitive diamond-graphite layer consists in that graphite deposited thereon can be more easily converted into diamond than ordinary graphite due to the orienting influence of the diamond surface and strict orientation of graphite. Small thickness of graphite blocks also facilitates the conversion of graphite into diamond. Thus, using diamond particles with diamond and diamond-graphite coating deposited thereon and providing the conditions corresponding to thermodynamic stability of diamond, the conversion of graphite into diamond is enabled and the diamond thus formed binds diamond grains into a single compact body.

Since a predetermined thickness of diamond-graphite coating and structural and phase state thereof are provided at the stage of preparation of diamond particles, a reduced crystalline defectiveness and improved cleavage strength, as well as the strength of the resulting member as a whole are achieved.

Deposition of diamond and diamond-graphite layer enables the maintenance and even some enlargement of size of the starting diamond particles so that diamond grains of practically any small size may be used.

Sintering of diamond powder with epitaxially deposited coating composed of diamond and diamond-graphite layers may be conducted in a high pressure and high temperature apparatus of any appropriate type which can provide the conditions for phase conversion of graphite into diamond. It should be noted that, due to the presence of diamond support and strict orientation of graphite in the diamond-graphite layer, the formation of diamond cleavage occurs with minimum value of temperature and pressure for graphite/diamond phase system.

As an example, the use can be made of an apparatus having a cylindrical reaction space with hard alloy or steel pieces at the ends of the cylindrical space and with the speripheral surface made of a material having thermal- and electrical insulating properties, such as lithographic stone.

Heating of diamond powder under pressure is effected by one of known methods, e.g. using a graphite heater with current flowing therein.

The pressure in the apparatus is determined by the known method, that is according to variation of resistance of metals, such as bismuth ($Bi_{I-II}$ - 25.5 kbar, $B_{IV-VII}$ - 77 kbar) tallium (Tl = 36.7 kbar), barium ($Ba_{II-III}$ - 55 kbar), tin ($Sn_{I-II}$ - 100 kbar), iron - 130 kbar.

The temperature in the high pressure apparatus can be measured with thermocouples.

Specific embodiments of the invention will now be illustrated by way of examples.

Example 1

Diamond-graphite layer was deposited in the following manner.

Seed diamond powder with grading 1/0 (grain size less than 1 $\mu$m) was placed in a reactor which was evacuated and heated at 950° C. Methane under a pressure of 3 mm Hg was passed over the powder to deposit thereon diamond and diamond-graphite layers. Two graphite electrodes were placed within the diamond powder so as to measure variations in electric resistance of the powder. The value of electric resistance at the beginning of the test was 10 MOhm. During the growing of diamond layer and formation of diamond-graphite layer the value of electric resistance of the powder decreased. The deposition was interrupted when the resistance was of 0.06 MOhm. Then the powder was poured from the reactor and weighed. On the basis of the weight increment thus measured and specific surface of the starting powder, which was determined beforehand, the thickness of diamond and diamond-graphite layer was calculated which was about 10Å in this particular case.

The diamond powder having a grading 1/0 with epitaxially deposited diamond and diamond-graphite coating of a thickness of 10Å was placed into a tubular graphite heater having the following dimensions: outside diameter — 7 mm, inside diameter — 4 mm, length — 4 mm, and sealed at both sides with graphite discs. The reaction vessel thus formed was then subjected to the action of pressure of 77 kbar at 1600° C and allowed to stay under these conditions for 60 seconds with subsequent lowering of temperature and pressure.

As a result, a polycrystalline diamond member was obtained which had the shape of a cylinder of 3.5 mm diameter and about 4 mm length.

The polycrystalline member weighed 0.5 ct.

For further use, the resulting polycrystalline diamond member was mechanically fastened in a mandrel and machined on a diamond-electrolytic machine to obtain a blade-type cutting tool.

The tests of tools of polycrystalline diamond members prepared as described above showed that in machining brass of LS69 grade (speed V = 400 m/min, longitudinal feed S = 0.02 mm per rev., cutting depth t = 0.10 mm) wear resistance at the trailing edge was $h_3$ = 0.044 mm after 1000 minutes of operation which corresponded to the distance of 500 km. Roughness of machined surfaces was of 8a - 8b classes.

The resulting polydrystalline diamond member left traces on the surfaces of a diamond single crystal.

EXAMPLE 2

A polycrystalline diamond member was prepared under the conditions described in Example 1, but the starting powder comprised microscopically fine diamond powder with grading 5/3 (grain size less than 5 μm), the pressure was 100 kbar, temperature — about 2800° C and residence time under pressure and heating was 5 seconds.

As a result, a polycrystalline diamond member was obtained which had the shape of a cylinder of 3.7 mm diameter and 4 mm length.

The polycrystalline diamond member had the following strength values under linear compression:
  prior to heat-treatment — 590 kg/mm$^2$
  after heat treatment (T = 1200° C, $t$ = 20 minutes) — 510 kg/mm$^2$.

EXAMPLE 3

A polycrystalline diamond member was prepared under the conditions described in Example 1, but the starting powder comprised microscopically fine diamond powder with grading 0.3/0 (grain size less than 0.3 μm), the pressure was 115 Kbar, temperature — about 3200° C, residence time under pressure and heating was 5 seconds. As a result, strong and dense polycrystalline members were obtained.

Mechanical tests showed that the ultimate strength of polycrystalline diamond members under linear compression was:
  prior to heat treatment — 400 kg/mm$^2$
  after heat treatment (T = 1200° C, $t$ = 20 minutes) — 360 kg/mm$^2$.

EXAMPLE 4

A polycrystalline diamond member was prepared under the conditions described in Example 1, but the starting powder comprised microscopically fine diamond powder with grading 3/0 (grain size less than 3 μm). The reaction vessel was subjected to the action of pressure of 40 kbar and temperature of 1000° C with residence time under these conditions of 120 seconds with subsequent lowering of temperature and pressure.

As a result, a cylindrical diamond member was obtained having a diameter of 3.7 mm and length of 4 mm.

Polycrystalline members were crushed to determine the strength of single grains of the resulting powder:
  prior to heat treatment (grading 630/500) — 15 kg
  after heat treatment (grading 630/500) (heat treatment conditions: T = 1200° C, $t$ = 20 minutes) — 12 kg.

It will be apparent from the above examples that the method according to the invention enables the use of diamond particles of practically any small size since it involves the use of particles having epitaxially deposited diamond-graphite coating on the surface thereof.

As a result, a high-strength polycrystalline diamond member is obtained which is structurally isotropic.

What is claimed is:

1. A method of preparing a polycrystalline diamond member comprising:
  using diamond particles of any size including those smaller than one micron, said particles having substantially identical size;
  epitaxially coating said particles in a flow of a carbonaceous medium to deposit both diamond and diamond-graphite coating on said particles;
  interrupting said coating at a predetermined moment prior to the formation of a pure graphite layer on the particles;
  bringing said particles into mechanical contact with one another and sintering them under a pressure of at least 40 kbar and at a temperature of at least 1000° C for a time sufficient for effecting phase conversions of the diamond-graphite material in the zones of contact of the diamond-graphite coatings of neighboring particles into diamond so as to strongly bind all particles into a single compact body.

2. The polycrystalline diamond member prepared as claimed in claim 1, containing a plurality of diamond particles bound into a single compact body, wherein the binder consists of diamond zones substantially free from graphite which are formed as a result of phase conversion in the zones of contact of diamond-graphite coatings of various neighbouring particles.

* * * * *